Figure 1:
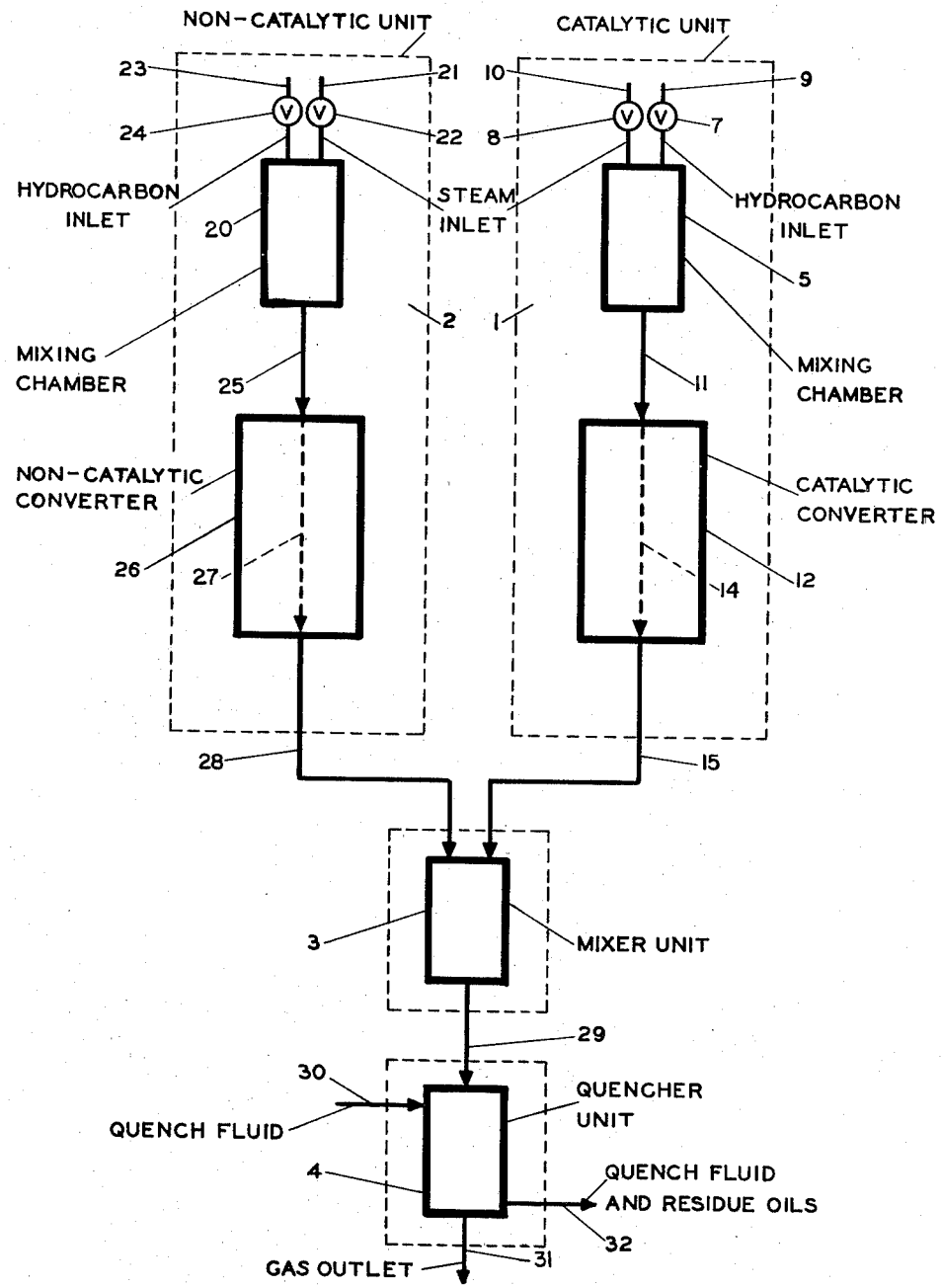

FIG. I

JAMES H. SHAPLEIGH.
INVENTOR.

JAMES H. SHAPLEIGH.
INVENTOR.

2,707,147

PRODUCTION OF DOMESTIC GAS

James H. Shapleigh, Wilmington, Del., assignor to Hercules Powder Company, Wilmington, Del., a corporation of Delaware Application February 7, 1948, Serial No. 6,859

1 Claim. (Cl. 48—196)

This invention relates to the production of utility gas and, more particularly, to a continuous porcess for producing utility gas of adjustable heating value and to the apparatus therefor.

Utility gas, i. e., fuel gas for household or factory consumption as produced by public utilities is manufactured by numerous processes from various raw materials, depending largely upon the available raw materials in the particular locality. For obvious reasons, the heating value of the utility gas must be fairly carefully controlled to fit the requirements of the equipment in which it is to be burned. If gas of low B. t. u. content is produced, it is usually enriched with volatile hydrocarbons, such as propane, and if gas of high B. t. u. content is produced, it is usually impoverished by dilution with products of partial combustion, with inert gases such as stack gases, or even with air. Due to consumer demand, many of the public utility companies have outgrown their equipment and are unable to supply an adequate amount of gas for periods of peak demand. Since the type of equipment currently used involves such a large investment expense, there is some hesitancy to enlarge their capacity by adding more equipment of the same type. Moreover, in additions to present equipment and in new installations, there is a potential demand for modern equipment of lower investment cost, greater ease of control, and greater flexibility. There is also a demand for more economical, flexible processes which can be carried out in such equipment.

Now, in accordance with this invention, there is provided a continuous process for producing a utility gas, the heating value of which is flexible, adjustable, and readily controllable. This novel process may be practiced with a single fluid hydrocarbon charging stock which may be either gaseous hydrocarbons, such as refinery gas, or liquid hydrocarbons such as kerosene, fuel oil, or crude oil. The process comprises converting fluid hydrocarbon into one mixture containing carbon oxides and hydrogen by the step of catalytic cracking with an oxidizing gas and converting fluid hydrocarbon into a second mixture containing low molecular weight hydrocarbons and hydrogen by a noncatalytic cracking step and continuously mixing the gaseous products. As the oxidizing gas, steam, air, carbon dioxide, or flue gases are suitable. The mixture of gaseous products contains carbon oxides, hydrogen, and normally gaseous hydrocarbons, the percentages of which can be controlled by the proper adjustment of the ratio of fuel passing to the catalytic unit to that passing to the noncatalytic unit. The mixture of carbon oxides and hydrogen produced by the catalytic reaction between the hydrocarbon charging stock and steam is a mixture of low heat value while the mixture of olefins and hydrogen produced by thermal cracking of the same hydrocarbon charging stock is a mixture of high heat value. The heat value of the utility gas produced by combining of these two types of gases produced from the fluid charging stock is thus intermediate and is regulated to any desired value by proper proportioning of the fuel to the two reactors.

Methods of producing hydrogen by the catalytic reaction between an oxidizing gas such as steam and hydrocarbons and methods of thermal cracking of hydrocarbons to produce olefins are well known. The most satisfactory processes involve reactions in heated tubes. In the case of the catalytic reaction, the tubes are filled with a catalyst of which many are known in the art and, in the case of thermal cracking, the tubes contain no catalyst although they may contain a space reducer of the type of a closed concentric tube to act as a filler.

In the thermal cracking of hydrocarbons, there is a great tendency for the unsaturates in the gas to polymerize on the walls of the conduits. Moreover, the gas flowing from the cracking tubes contains hydrocarbons of high molecular weight which condense into droplets when the temperature is lowered and aid in building up a layer on the conduit walls which eventually clogs the conduits. The gas produced in the catalytic cracking of hydrocarbons in the presence of steam, on the other hand, does not contain sufficient amounts of polymerizable olefins or droplets of high molecular weight hydrocarbons to cause difficulties due to clogging of the conduits. One advantage of the present invention of combining the gases produced in the thermal cracking process with the gases produced in the catalytic process in accordance with this invention has been found to lie in the ability of the gases from the catalytic cracking to inihibit the clogging of the conduits. It is believed that this advantage results from the dilution effect and the quenching of the thermally cracked product. Moreover, gases from the catalytic step contain steam which acts to inhibit carbon formation in the thermally cracked product and there is a general beneficial effect from the increased quantity of hydrogen and carbon monoxide. To obtain the greatest benefit due to the dilution effect or quenching, the dilution or quenching treatment should be applied to the products of thermal cracking suddenly, i. e., before the products have traveled through any substantial length of conduit or have dropped appreciably below the temperature of the thermal cracking unit. Further advantages of the process of combining the products of the catalytic cracking unit with the products of the thermal cracking unit will be more fully described hereinafter.

The cracking processes of this invention may be carried out by the process of Reissue Patent 21,521 to James H. Shapleigh in an apparatus containing straight vertical tubes described in said patent.

In this apparatus the tubes are heated in a furnace by hot combustion gases with burners at various levels in a multiple tube furnace and the burner gases are preferably initially directed tangential to the tubes so that the hot combustion gases rise in a circulatory motion from the lower end of the furnace to the upper end and out through the exhaust outlet. The gases leaving the furnace are generally well above the temperature of the tubes at the exit zone and contain usable heat.

The temperature of reaction for the catalytic reaction to produce carbon oxides and hydrogen may be within the range of about 1200° F. to about 3000° F. but is normally within the range of about 1200° F. to about 2000° F. The temperature of reaction for the cracking of the hydrocarbon fuel to olefins and hydrogen is within the range of about 700° F. and about 2000° F. A satisfactory temperature range for the production of normally gaseous olefins lies within the range of about 1100° F. and about 1900° F.

Since the thermal cracking process can be carried out at a somewhat lower temperature than the catalytic process, it has been found advantageous to so combine the two processes in a single unit that certain economies of heat can be effected in a single furnace. Thus, it has been found that the tubes containing a suitable catalyst may be placed in that part of the furnace that gets most of the direct heat and the tubes containing no catalyst, in which the thermal reaction is effected, may be placed in that part of the furnace through which those gases pass which have circulated around and given up heat to the tubes containing catalyst.

The preferred type of furnace uses counterflow heating, wherein the hot combustion gases rise while circulating around the tubes countercurrent to the flow of gas within the tubes, at least in the case of the tubes containing the catalyst. This same type of countercurrent flow may also be used in the case of the tubes not containing catalyst. However, it is preferred for reasons of heat economy to pass the hot combustion gases countercurrent with respect to the tubes containing catalyst and to circulate the combustion gases thence around the tubes containing no catalyst.

Figure 2:
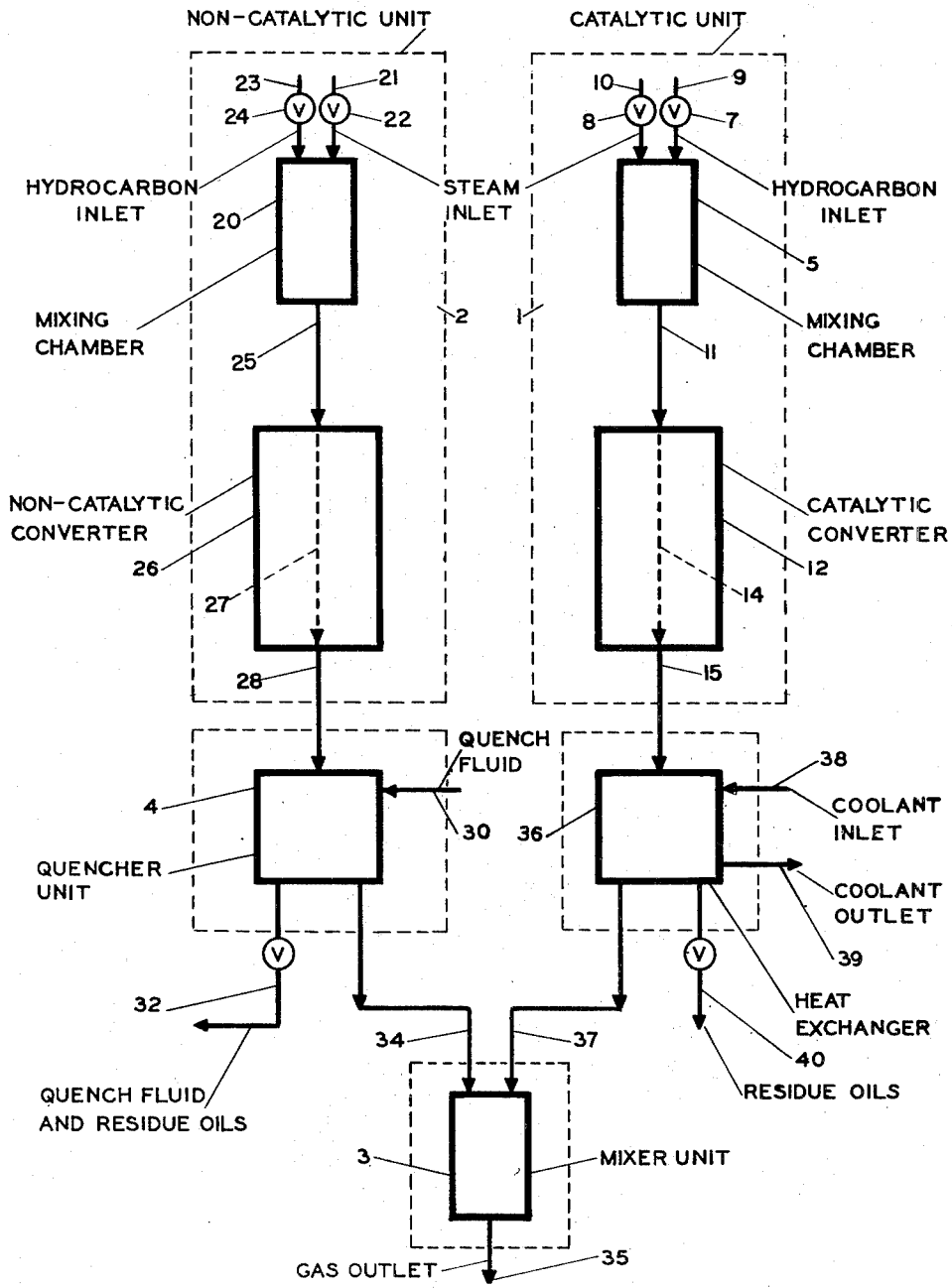
Figure 3:
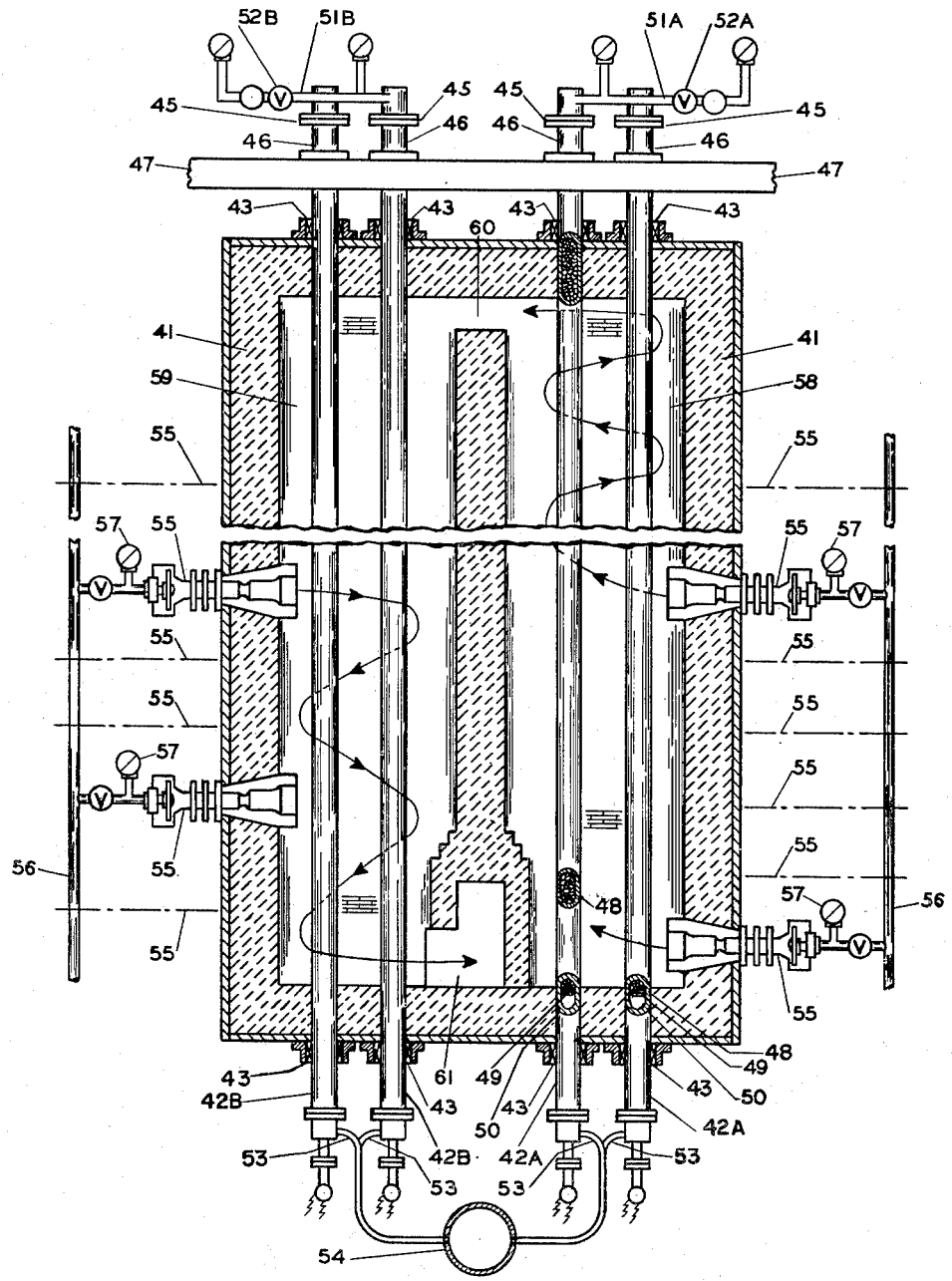

This invention will be more fully understood by reference to the accompanying drawings which illustrate the process and one form of suitable apparatus. Figures 1 and 2 are diagrammatic flow sheets giving examples of the process of the invention with respect to steam as the oxidizing gas, wherein the catalytic and the noncatalytic processes are indicated as separate units. Figure 3 is an elevation of apparatus constructed according to one embodiment of the present invention.

Referring now particularly to Figure 1 of the accompanying drawings, 1 represents a catalytic unit for the production of gas of low B. t. u., 2 represents a noncatalytic unit for the production of gas of high B. t. u., 3 represents a mixer unit for combining the gaseous products of the catalytic and the noncatalytic units to form a utility gas of an intermediate B. t. u., and 4 represents a quencher unit.

Referring now to the catalytic conversion unit 1 in which a mixture of steam and hydrocarbon charging stock is contacted with a catalyst, a suitable mixture of steam and hydrocarbon charging stock is obtained by passing hydrocarbon charging stock and steam into mixing chamber 5 through valves 7 and 8, respectively, for controlling the flow of hydrocarbon charging stock through conduit 9 and steam through conduit 10. The mixture passes through conduit 11 to the catalytic converter 12. While the mixing chamber 5 is shown as a separate unit, it may be wholly or partly within the converter 12. The catalytic converter, preferably, comprises at least one long vertically disposed tube 14 containing catalyst (not shown) over which the hydrocarbon-steam mixture passes in a downward direction. The unit usually contains several such tubes. Each catalyst tube 14 is heated at a temperature such that the catalyst inside is maintained at a temperature within the range of about 1200° F. and about 2000° F., preferably by combustion gases flowing upwardly and circulating about each tube 14, i. e., countercurrent to the downward flow within the tube. The products of conversion from the catalytic unit pass by way of conduit 15 to the mixer unit 3. The gaseous products consisting chiefly of hydrogen and carbon oxides forming a mixture of low B. t. u., which pass through conduit 15 to mixer unit 3, need not be cooled but may be cooled and freed of condensables before passing to the mixer unit 3 by passing through a cooling unit (not shown).

The noncatalytic unit is, in general, similar to the catalytic unit with the exception that the reaction tubes contain no catalyst. Steam passes to a mixing chamber 20 through conduit 21 and valve 22 by which the rate of flow is controlled. Hydrocarbon charging stock passes to the mixing chamber 20 through conduit 23 and valve 24 by which the rate of flow of the hydrocarbon charging stock is controlled. While the mixing chamber 20 is shown as a separate unit, it may be wholly or partly within the converter 26. The mixture of steam and hydrocarbon charging stock flows from mixing unit 20 through conduit 25 to the noncatalytic converter 26, where it flows through at least one tube 27 heated so that the material passing through is maintained at a temperature within the range of about 700° F. and about 2000° F. and then passes out by way of conduit 28 to mixer unit 3 where the products of thermal cracking are diluted by the gas from the catalytic converter. The mixture of gases and residue oils coming from the converters passes through the mixer unit 3 by way of conduit 29 to quencher unit 4 where the mixed gases are quenched to a temperature within the range of about 80° F. and about 600° F. by a quench fluid introduced through conduit 30. The quenching process separates residue oils, and the gas of desired B. t. u. is withdrawn continuously at the gas outlet 31. The quench fluid may be withdrawn through conduit 32. It is cooled by circulation through a heat exchanger and may also be freed of water before returning through conduit 30. Since this quench fluid picks up residue oils, a portion is continuously withdrawn to provide charging stock for the catalytic converter and the remainder is recirculated through conduit 30 in the quench unit 4. The heat exchanger and water separation units are conventional and are not shown.

The gas withdrawn at outlet 31 is a mixture having the desired B. t. u. determined by the ratio of gas of low B. t. u. produced in the catalytic converter 12 to the gas of high B. t. u. produced in the noncatalytic converter 26.

Figure 2 is a diagrammatic flow sheet similar to that of Figure 1 except that the quencher unit 4 is used only for quenching the products of the noncatalytic unit. The description of the flow sheet of Figure 1 may be applied to that of Figure 2 up to the description of the treatment of the gases flowing from the converters 12 and 26 through conduits 15 and 28. In Figure 2, the gas of low B. t. u. produced in the catalytic converter 12 flows by way of conduit 15 through a heat exchanger 36 where it is cooled and freed of residue oils and water and thence to the mixer unit 3. The heat exchanger 36 is cooled by a coolant flowing in at 38 and out at 39. The residue oils and water are removed through valved conduit 40. The gas of high B. t. u. produced in the noncatalytic converter 26 flows by way of conduit 28 directly to the quench unit 4 where it is quenched to a temperature within the range of about 80° F. and about 600° F. by means of the quench fluid circulated in through a conduit 30 and out through a valved conduit 32. The quenched gas of high B. t. u., containing at its ambient temperature water and hydrocarbons, flows out through conduit 34 to the mixer unit 3 where it is diluted with gas of low B. t. u. from the catalytic converter and the partial pressure of the hydrocarbon in the vapor is greatly reduced. The resulting gas mixture has an intermediate B. t. u. depending upon the ratio of gas produced in catalytic converter 12 to that produced in noncatalytic converter 26. The quench fluid circulating through the quencher unit 4 is similar to that previously described and is treated as described with respect to the flow sheet of Figure 1 and a portion of the quench fluid containing the residual oils picked up from the products flowing from the noncatalytic converter 26 is diverted to conduit 9 to provide a charging stock for the catalytic converter or it may be diverted to provide fuel. The heat withdrawn from the products in the quencher unit may be used for the generation of steam to be used in the process or for provision of heat for distillation of by-product hydrocarbons.

Referring now to Figure 3 of the accompanying drawings, 41 represents a furnace, constructed preferably of fire brick, containing metal alloy catalyst tubes 42a and 42b placed vertically in planes parallel to the side walls of the furnace. The tubes are constructed of a nickel-chromium-iron alloy adapted to withstand high temperatures. The tubes 42a and 42b project through the top and bottom of the furnace, passing through tiles 43. The projecting ends of the tubes and the outer surface of the furnace may, if desired, be covered with insulating material (not shown to enhance clarity). Tubes 42a and 42b are supported by means of any suitable support at the top of each tube, e. g., the upper flange 45 of tube 42a rests upon a short collar 46, through which tube 42a may pass freely. Collar 46 is supported by, and fastened to, steel beam 47, supported in any suitable manner upon the furnace housing. Any of tubes 42a and 42b may be readily removed from the furnace by disconnecting it at the flange and lifting it vertically from the furnace.

Tubes 42a are filled with a suitable catalytic material 48, supported by a perforated alloy plate 49. Suitable catalysts are hereinafter disclosed. Plate 49 is removable and rests upon support 50 attached to the inner surface of the tube. The tubes 42a may be removed and replaced, even when filled with catalyst, in the manner already described, and the catalyst may be placed in the tubes or removed therefrom, both while the tubes are in the furnace or at other places remote from the furnace.

Tubes 42b do not contain catalyst but may contain inert filler or concentric "core busters" to aid in supplying heat required for the reaction. Where tubes 42b contain an inert filler, it is supported by a perforated alloy plate similar to plate 49 in catalyst tubes 42a. These tubes 42b may also be removed in the same manner as described for tubes 42a.

The hydrocarbon charging stock is supplied through convenient pipes, which may differ from those shown in the accompanying drawings as circumstances and process may require. In the present example, a mixture of hydrocarbon charging stock and steam is forced through conduit 51a controlled by valve 52a into tubes 42a. A similar conduit 51b controlled by a valve 52b leads a mixture of hydrocarbon charging stock and steam to tubes 42b. The hydrocarbon charging stock and steam may also be introduced to the tubes through separate conduits so that the mixing takes place in the upper zones of the tubes.

The gases leaving the lower end of tubes 42a and 42b pass through separate lines 53 into mixing chamber 54, which is part of a header suitably supported (not shown) and free to move with expansion and contraction of tubes 42a and 42b.

Burners 55, not all shown in detail, are located in the side wall of furnace 1 at various levels. Suitable burners are those giving a short flame, such as inspirator-type N571–A, made by the Surface Combustion Corporation. Gas is supplied to the burners through gas conduits 56, the pressure being indicated by gauge 57. The combustion gases from the burners pass into the furnace substantially tangentially to catalyst-containing tubes 42a and pass upwardly around the tubes 42a with a circulatory motion, at the same time heating the inner surface walls to a high temperature and radiating heat from said walls to tubes 42a and 42b.

In the particular embodiment of the present invention shown, the furnace is divided into cell 58 in which are located the tubes 42a filled with catalyst and cell 59 in which are the tubes 42b not containing catalyst. With the tubes 42a containing catalyst in a separate cell from the tubes 42b containing no catalyst, the heat supplied to the tubes 42a and 42b can be separately controlled. For example, cell 58 is desirably supplied more heat than is cell 59 and the hot combustion gases leaving cell 58 are led by duct 60 into cell 59 where they provide part of the heat required for heating tubes 42b. The combustion gases may circulate downwardly around tubes 42b and out through flue 61 to a connecting stack (not shown).

In the combination of the catalytic process with the noncatalytic process of Figure 1, wherein the noncatalytic gas is diluted with the catalytic gas in the mixer unit 3, the dilution effect reduces the partial pressure of the unconverted oils in the mixture and reduces the tendency toward polymerization of olefins and condensation in the conduits. In order to get the greatest benefit from the dilution, the catalytic gas is mixed with the noncatalytic gas at a point as close to the noncatalytic converter as is practical. The mixer unit of Figure 1 may comprise a section of conduit 28 or it may be combined with the quencher unit 4 and the dilution and quenching may be simultaneous if desired. A further modification of the process of Figure 1 which forms an added improvement in operating efficiency is the addition of a cooling unit ahead of the mixer unit for the catalytic gas. The catalytic gas flowing through conduit 15 is normally hotter than the noncatalytic gas flowing through conduit 28 and the dilution with hot gas maintains a temperature sufficiently high to aid in the prevention of polymerization of olefins and condensation of vapors on the conduit walls. If the catalytic gas is cooled before mixing with the non-catalytic gas, the temperature of the resulting mixture can be reduced below the temperature favoring polymerization of olefins and the dilution effect alone reduces the partial pressure of vapor in the gas mixture.

The catalytic process is usually carried out in such a manner that very little residual oils or none at all pass out of the converter. The noncatalytic process, on the other hand, is preferably carried out in such a manner that sufficient residual oils come out of the converter to keep the residue oils in a satisfactory fluid state. The residue oils can be recirculated through a cooler and be used as a quench fluid and part may be withdrawn to be used as a charging stock. It is preferably used largely as a charging stock for the catalytic unit. Moreover, if the residue oils are withdrawn as an emulsion, they may be used directly as suitable charging stock.

In the quench unit the gas is separated from the residue oils. The quenching process may be carried out in more than one way. Thus, it may be carried out in a single one step process wherein the water and residue oils are condensed out together and the gas is withdrawn at the gas outlet or it may be carried out in a plurality of steps. In the case of a quencher process using a plurality of steps, the gases containing residue oils and water may be subjected first to a quenching temperature low enough to separate out residual oils but not sufficiently low to condense steam. The mixture of desired gases and steam may then be subjected to a quenching process at such a temperature that steam and normally liquid hydrocarbons are condensed in a second step, or if desired the steam and normally liquid hydrocarbons can be separated individually by use of separate quenching at different temperatures. The quenching process using one or several steps may be combined in a single unit and may even be so designed that only a single piece of apparatus is involved.

The quench fluid, water, and residue oils may be withdrawn from the quench unit as a mixture, or they may be withdrawn separately through individual conduits if the apparatus provides for the separation within the quench unit.

The quench fluid may be water or it may be and preferably is any liquid hydrocarbon which is substantially nonvolatile at the temperature to which the products are quenched and which is of sufficiently low viscosity to be readily circulated. The quench fluid may be for example residue oils chiefly from the noncatalytic process or it may be a water emulsion of these oils.

The quench fluid may be added as a cool spray to the incoming gas stream. The quench fluid mixes intimately with the gas, water and residue oils from the converters and cools them to the desired temperature in one or more steps. The gas is withdrawn and may be further chilled for further drying if desired. The quench fluid may be circulated to the heat exchanger for cooling and excess water may be removed or an emulsion of water and oil may be circulated as the quench fluid. Part of the quench fluid may be withdrawn before or after cooling for use as a charging stock for the converters or for use as fuel. When used as a charging stock, the quench fluid may be used with or without water emulsified therewith and may be further fortified with other hydrocarbon charging stock if desired. When residue oils are recirculated as the quench fluid, the operation is generally carried out in such a manner that the residue oil being recirculated has the proper viscosity. This may be controlled by adjusting the per cent cracking in the noncatalytic converters, by addition of a suitable fluid hydrocarbon compatible with the residue oil, or by adjustment of the temperature of cooling in the quencher. Obviously, if quenching is made a two-step operation, heavier quench oil may be used for initial cooling to an intermediate temperature and lighter quench fluid may be used for secondary cooling to the lower temperature.

In the quencher, the ultimate contacting of the hot products coming from the converters with the quench fluid brings about a small degree of reaction with the quench fluid especially when the quench fluid is a fluid hydrocarbon. This may result in some hydrogen being produced from the quench fluid. The viscosity of the quench fluid, if a hydrocarbon, may be affected thereby. Such reaction taking place in the quencher will not have any adverse effect on the process, however.

Suitable catalysts for the production of hydrogen by cracking hydrocarbons possess high activity and physical strength and shrink very little at the operating temperatures employed. Oxides or metals of the iron group, admixed with aluminum oxide, form desirable catalysts. Calcium and magnesium oxides and silica may be added to produce catalysts of greater strength at high temperatures. Phosphoric acid with alumina and nickel oxide produces a very active catalyst which shrinks very little at high temperatures. A particularly suitable catalyst is prepared from nickel oxides, magnesia, and kaolin. The catalyst is usually prepared in the form of a paste, cut into small cubes, dried slowly, then heated slowly in the presence of steam to a temperature of about 500° F. higher than the operating temperature at which it is to be used, and then held at this temperature for about 24–48 hours. Such roasting treatment causes most of the shrinkage to take place before use of the catalyst. Dried catalyst may also be charged into the tubes and the final roasting step then performed with the tubes in place in the furnace, additional catalyst being added to make up for shrinkage. The catalyst should not be roasted at so high a temperature as to cause serious decrease in catalytic activity.

It is preferred to use a catalyst in the furnace comprising diaspore impregnated with nickel nitrate so as to contain about 6% by weight of nickel and heating to about 500° F. to decompose the nitrate, then reduced by passing therethrough hot reducing gases. Preferably, this catalyst mass comprises particles from about $3/8$ inch to about $5/8$ inch in diameter.

By way of illustration, the following table of data is given to show the analyses of gas produced during representative catalytic cracking operations using diesel oil as the hydrocarbon charging stock and a supported nickel catalyst of the type described.

| Example No. | 1 | 2 | 3 |
|---|---|---|---|
| Water:Hydrocarbon Ratio (by wt.) | 3:1 | 5:1 | 3:1 |
| Catalyst Temperature (approx.), °F | 1,600 | 1,550 | 1,500 |
| Gas Analysis: | | | |
| $CO_2$ | 11.5 | 9.5 | 6.8 |
| CO | 16.9 | 12.0 | 11.5 |
| $CH_4$ | 4.2 | 12.5 | 15.4 |
| Olefins | 1.7 | 9.3 | 16.5 |
| $H_2$ | 65.5 | 55.3 | 49.5 |
| B. t. u. | 338 | 494 | 620 |

The table following illustrates representative noncatalytic cracking results of several hydrocarbon fuels, using water in the reaction as a diluent for the prevention of carbon deposition.

| Example No. | 4 | 5 | 6 |
|---|---|---|---|
| Water:Hydrocarbon Ratio (by wt.) | 3:1 | 3:1 | 1.9:1 |
| Hydrocarbon Charging Stock | E. Texas Crude Oil | Deasphalted Crude Oil Residue | Diesel Oil |
| Reaction Temperature (approx.) | 1,400° F | 1,400° F | 1,400° F |
| Gas Analysis (percent by volume): | | | |
| CO | 3.2 | 2.8 | 0.0 |
| $CO_2$ | 4.2 | 1.7 | 1.7 |
| $H_2$ | 27.4 | 12.5 | 15.3 |
| $CH_4$ | 28.0 | 27.2 | 19.0 |
| $C_2H_4$ | 29.6 | 37.0 | 33.0 |
| $C_3H_6$ | 3.2 | 8.7 | 16.2 |
| $C_4H_8$ | 2.2 | 6.5 | 9.3 |
| Other Hydrocarbons | 2.3 | 3.7 | 4.6 |
| B. t. u. | 1,052 | 1,406 | 1,508 |

A utility gas of this invention produced by combining equal volumes of the catalytically converted gas of Example 1 with the noncatalytically converted gas of Example 6 will have a heat value of 923. Utility gas of any described heat value within the range of about 340 B. t. u. and about 1500 B. t. u. can be obtained by mixing these gases in the proper proportions. While it is preferred to use a single hydrocarbon charging stock supply, it is also possible within the scope of this invention to use the gas derived from one hydrocarbon charging stock converted in the catalytic unit and that derived from another hydrocarbon converted in the noncatalytic unit. Thus, the gas from any of the Examples 1, 2, or 3 may be mixed with the gas from any of the Examples 4, 5, or 6 to produce a utility gas within the scope of this invention.

The fluid hydrocarbon charging stock may be any hydrocarbon, such as refinery gas or crude oil, or any fraction thereof, such as propane, butanes, butenes, propenes, pentanes, pentenes, hexanes, hexenes, heptanes, heptenes, octanes, octenes, naphtha, fuel oil, kerosene, gasoline, petroleum gas, diesel oil, crude oil residues or gases or residues from noncatalytic cracking or mixtures of these. While the versatility of the process makes all types of fluid hydrocarbons satisfactory charging stocks, those of high paraffinic content are most advantageous when used as the sole charging stock. The charging stock may also be added as an emulsion with water such as for example residue oils emulsified with water and added water and fluid hydrocarbon charging stock may be admixed with the emulsion if desired.

When oxygen or air is used in the catalytic process as the oxidizing gas initial reaction is exothermic with formation of intense heat, carbon dioxide and water. In this zone of reaction where combustion temperatures may exceed about 300° F. it is necessary to protect metal reaction tube walls by providing suitable radiating or other heat extracting conditions. The hot gases in this zone thus comprise a mixture of hydrocarbons, carbon dioxide and water. Reaction of hydrocarbons with the generated carbon dioxide and water then takes place endothermically in the catalyst bed. Hot gases from the combustion zone may raise the temperature of the initial portion of the catalyst bed to a temperature within the range of about 2700° F. and 3000° F. under which conditions the gas temperature at this zone is above safe temperatures with respect to the containing metal walls and requires that substantial heat loss from the metal walls take place so as to maintain safe metal wall temperatures. As the hot gases pass further into the catalytic bed the endothermic reaction lowers the temperature of the gases and further heat may then be provided through the walls of the catalyst tubes in the furnace. Thus, when the catalytic process is carried out with air or oxygen as the oxidizing gas the temperature of the catalyst bed will be within the range of about 1200° F. and about 3000° F. although most of the catalyst bed will be within the temperature range of about 1200° F. and about 2000° F. and only a small part will be in the range above about 2000° F. It will be obvious from theoretical considerations that the ratio of carbon monoxide to carbon dioxide will be higher at the higher temperature.

In the noncatalytic process, steam or other oxidizing gas may be introduced as pointed out above to aid in the prevention of carbon deposition. In one particularly satisfactory embodiment of the present invention, the oxidizing gas is provided by gas produced in the catalytic converter. Thus, conduit 15 of Figure 1 or Figure 2 is tapped and a portion of the hot gas, containing largely hydrogen, oxides of carbon, and steam, is led to steam inlet 21 and is introduced at elevated temperature to the mixing chamber of the noncatalytic unit. This modification brings about improved, smoother cracking of the hydrocarbon charging stock with reduction in the viscosity of the residue oils. As a result of such a reduction in viscosity, more complete cracking can be effected and less hydrocarbon need be passed through the converter unchanged to keep the residue oils fluid.

The heat value of the products from both the catalytic unit and the noncatalytic unit is controlled largely by the rate of flow of the reactants through the tube and by the rate of supply of heat. Thus, if the rate of flow in the unit is to be increased, and it is not desired to change the composition of the gaseous product, the heat supplied to the furnace should likewise be increased so that the temperature in the reaction chamber is not undesirably changed.

While the temperature of the catalyst in the catalytic unit and the temperature of the reaction chamber in the noncatalytic unit have been given as a range, it is understood that the temperatures vary throughout the length of the catalyst bed and the reaction chamber so that no fixed value can be given. In the examples, the temperature given is the temperature at which the major part of the reaction takes place.

Since the apparatus of this invention is more economically constructed and involves less capital investment than the water gas sets, coke ovens, and the like, and is much more flexible in control and versatility as to the type of gas produced and may be operated in a continuous manner, it is far superior to present-day apparatus for the production of utility gas from fluid hydrocarbon fuels. The high versatility of the process in giving gas of heating values over a wide range makes the process highly advantageous as a source of gas for adjusting heating values in gas produced from the usual fixed processes, and to provide additional gas for periods of peak loads.

What I claim and desire to protect by Letters Patent is:

In a continuous process for the production of utility gas, the improvement which comprises passing fluid hydrocarbon and oxidizing gas through at least one catalytic tube containing a dehydrogenation catalyst maintained at a temperature within the range of about 1200° F. and about 2000° F. by heat applied externally of the tubes by means of hot gases of combustion emanating from spaced burners to obtain catalytic reaction products predominantly composed of hydrogen and carbon oxides; passing fluid hydrocarbon, oxidizing gas and a portion of the catalytic products through at least one noncatalytic tube maintained at a temperature within the range of about 700° F. and about 2000° F. by heat applied externally of the tubes by means of hot combustion gases emanating from spaced burners to fractionally vaporize the fluid hydrocarbon and form a gaseous, noncondensable fraction of higher hydrogen to carbon ratio than the feed stock and a condensable fraction of lower hydrogen to carbon ratio than the feed stock; and combining the catalytic reaction products with the gaseous, noncondensable, noncatalytic reaction products to form a utility gas having a heating value within the range of about 300 B. t. u. and about 1400 B. t. u.

References Cited in the file of this patent

UNITED STATES PATENTS

| | | |
|---|---|---|
| Re. 21,521 | Shapleigh | July 30, 1940 |
| 137,521 | Whipple et al. | Apr. 1, 1873 |
| 151,002 | Blunt | May 19, 1874 |
| 209,630 | Strong | Nov. 5, 1878 |
| 314,342 | Moore | Mar. 24, 1885 |
| 326,488 | Egner | Sept. 15, 1885 |
| 495,917 | Stevens et al. | Apr. 18, 1893 |
| 1,373,704 | Bates | Apr. 5, 1921 |
| 1,767,357 | Garner | June 24, 1930 |
| 1,868,462 | Huff | July 19, 1932 |
| 1,992,909 | Davis | Feb. 26, 1935 |
| 2,028,326 | Hanks et al. | Jan. 21, 1936 |
| 2,544,188 | Steinschlaeger | Mar. 6, 1951 |